US008341978B2

(12) United States Patent
Hofmann et al.

(10) Patent No.: US 8,341,978 B2
(45) Date of Patent: *Jan. 1, 2013

(54) METHOD OF MANUFACTURING HIGH PERFORMANCE GLASS FIBERS IN A REFRACTORY LINED MELTER AND FIBER FORMED THEREBY

(75) Inventors: Douglas A. Hofmann, Hebron, OH (US); Peter B. McGinnis, Gahanna, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,289

(22) Filed: Sep. 13, 2010

(65) Prior Publication Data

US 2011/0000263 A1   Jan. 6, 2011

Related U.S. Application Data (63) Continuation of application No. 11/267,702, filed on Nov. 4, 2005, now Pat. No. 7,823,417.

(51) Int. Cl.
*C03B 3/00* (2006.01)
*C03B 5/00* (2006.01)
*C03C 3/085* (2006.01)
*C03C 13/06* (2006.01)

(52) U.S. Cl. ............... 65/335; 65/347; 501/35; 501/36; 501/69

(58) Field of Classification Search .................. 65/335, 65/347; 501/35, 36, 69
See application file for complete search history.

(56) References Cited

U.S. PATENT DOCUMENTS

| | | | |
|---|---|---|---|
| 3,044,888 A | 7/1962 | Provance et al. | |
| 3,189,471 A * | 6/1965 | Thomas | 501/35 |
| 3,220,915 A | 11/1965 | Shannon | |
| 3,360,386 A | 12/1967 | Kelley et al. | |
| 3,402,055 A | 9/1968 | Harris | |
| 3,408,213 A | 10/1968 | Provance et al. | |
| 3,484,259 A | 12/1969 | Lewis et al. | |
| 3,498,805 A | 3/1970 | Stalego | |
| 3,524,738 A | 8/1970 | Grubb et al. | |
| 3,535,096 A | 10/1970 | Bour et al. | |
| 3,709,705 A | 1/1973 | Hagedorn | |
| 3,804,646 A | 4/1974 | Dumbaugh, Jr. | |
| 3,833,388 A | 9/1974 | Ohlberg | |
| 3,861,926 A | 1/1975 | Irlam et al. | |
| 3,876,481 A | 4/1975 | Erickson et al. | |
| 3,887,386 A | 6/1975 | Majumdar | |
| 3,892,581 A | 7/1975 | Burgman et al. | |
| 3,904,423 A | 9/1975 | Guthrie | |
| 3,945,838 A | 3/1976 | Erickson et al. | |
| 4,002,482 A | 1/1977 | Coenen | |
| 4,012,131 A | 3/1977 | Krohn | |
| 4,046,948 A | 9/1977 | Zlochower | |
| 4,063,001 A | 12/1977 | Zlochower | |
| 4,090,882 A | 5/1978 | Rauschenfels | |
| 4,199,364 A * | 4/1980 | Neely | 501/35 |
| 4,325,724 A | 4/1982 | Froberg | |
| 4,366,251 A | 12/1982 | Rapp | |
| 4,375,527 A | 3/1983 | Zahner | |
| 4,386,164 A | 5/1983 | Moser | |
| 4,491,951 A | 1/1985 | Dunn | |
| 4,569,471 A | 2/1986 | Ingemansson | |
| 4,582,748 A | 4/1986 | Estes | |
| 4,764,487 A | 8/1988 | Lewis | |
| 4,824,806 A | 4/1989 | Yokoi et al. | |
| 4,857,485 A | 8/1989 | Brennan et al. | |
| 4,882,302 A | 11/1989 | Horiuchi et al. | |
| 4,892,846 A | 1/1990 | Rogers et al. | |
| 4,935,291 A | 6/1990 | Gunnink | |
| 4,976,587 A | 12/1990 | Johnston et al. | |
| 5,212,121 A | 5/1993 | Omata | |
| 5,248,637 A | 9/1993 | Taneda et al. | |
| 5,302,444 A | 4/1994 | Jackson et al. | |
| 5,332,699 A | 7/1994 | Olds et al. | |
| 5,474,425 A | 12/1995 | Lawlor | |
| 5,569,629 A | 10/1996 | TenEyck et al. | |
| 5,576,252 A | 11/1996 | Rapp et al. | |

(Continued)

FOREIGN PATENT DOCUMENTS

CA   2528923   12/2004

(Continued)

OTHER PUBLICATIONS

Office action from U.S. Appl. No. 09/703,234 dated Apr. 15, 2002.
Office action from U.S. Appl. No. 09/703,234 dated Sep. 06, 2002.
Advisory action from U.S. Appl. No. 09/703,234 dated Nov. 19, 2002.
Office action from U.S. Appl. No. 09/703,234 dated Feb. 4, 2003.
Office action from U.S. Appl. No. 09/703,234 dated Jul. 11, 2003.
Advisory action from U.S. Appl. No. 09/703,234 dated Oct. 24, 2003.
Office action from U.S. Appl. No. 09/703,234 dated Dec. 16, 2003.
Notice of Allowance from U.S. Appl. No. 09/703,234 dated Jul. 6, 2004.
Office action from U.S. Appl. No. 10/560,068 dated Aug. 1, 2008.
Office action from U.S. Appl. No. 10/560,068 dated Dec. 15, 2008.

(Continued)

*Primary Examiner* — Karl Group
*Assistant Examiner* — Elizabeth A Bolden
(74) *Attorney, Agent, or Firm* — Calfee, Halter & Griswold LLP (57) ABSTRACT

A method of forming high strength glass fibers in a refractory lined glass melter is disclosed. The refractory lined melter is suited to the batch compositions disclosed for the formation high modulus, and high-strength glass fibers. The glass composition for use in the method of the present invention is up to about 70.5 Weight % $SiO_2$, 24.5 weight % $Al_2O_3$, 22 weight % alkaline earth oxides and may include small amounts of alkali metal oxides and $ZrO_2$. Oxide based refractories included alumina, chromic oxide, silica, alumina-silica, zircon, zirconia-alumina-silica and combinations thereof. By using oxide based refractory lined furnaces the cost of production of glass fibers is substantially reduced in comparison with the cost of fibers using a platinum lined melting furnace. Fibers formed by the present invention are also disclosed.

21 Claims, 4 Drawing Sheets

U.S. PATENT DOCUMENTS

| | | | |
|---|---|---|---|
| 5,585,312 | A | 12/1996 | TenEyck et al. |
| 5,691,255 | A | 11/1997 | Jensen et al. |
| 5,719,092 | A | 2/1998 | Arrington |
| 5,789,329 | A | 8/1998 | Eastes et al. |
| 5,843,853 | A | 12/1998 | Heitmann et al. |
| 5,851,932 | A | 12/1998 | Dickson et al. |
| 5,935,886 | A | 8/1999 | Jensen et al. |
| 5,948,535 | A | 9/1999 | Chiurlo et al. |
| 5,962,354 | A * | 10/1999 | Fyles et al. ............ 501/36 |
| 5,997,977 | A | 12/1999 | Zou et al. |
| 6,063,470 | A | 5/2000 | Zou et al. |
| 6,069,100 | A | 5/2000 | Naumann et al. |
| 6,089,021 | A | 7/2000 | Senandayake |
| 6,101,847 | A | 8/2000 | Shamp |
| 6,136,735 | A | 10/2000 | Gallo et al. |
| 6,156,683 | A | 12/2000 | Grove-Rasmussen et al. |
| 6,169,047 | B1 | 1/2001 | Nishizwa et al. |
| 6,214,429 | B1 | 4/2001 | Zou et al. |
| 6,237,369 | B1 * | 5/2001 | LeBlanc et al. ............ 65/134.1 |
| 6,248,678 | B1 | 6/2001 | Pinckney |
| 6,300,264 | B1 | 10/2001 | Ohara |
| 6,306,786 | B1 | 10/2001 | Koyama et al. |
| 6,314,760 | B1 | 11/2001 | Chenoweth |
| 6,329,310 | B1 | 12/2001 | Peuchert et al. |
| 6,358,873 | B1 | 3/2002 | Stewart |
| 6,376,403 | B1 | 4/2002 | Koyama et al. |
| 6,399,527 | B1 | 6/2002 | Kishimoto et al. |
| 6,403,676 | B1 | 6/2002 | Jia et al. |
| 6,422,041 | B1 | 7/2002 | Simpson et al. |
| 6,451,720 | B1 | 9/2002 | Kishimoto |
| 6,457,943 | B1 | 10/2002 | Olsen et al. |
| 6,458,436 | B1 * | 10/2002 | Hansen et al. ............ 428/34.5 |
| 6,496,706 | B1 | 12/2002 | Jon et al. |
| 6,540,508 | B1 | 4/2003 | Simpson et al. |
| 6,579,599 | B1 | 6/2003 | Blum et al. |
| 6,686,304 | B1 * | 2/2004 | Wallenberger ............ 501/35 |
| 6,794,322 | B2 | 9/2004 | Sircar |
| 6,809,050 | B1 * | 10/2004 | McGinnis ............ 501/35 |
| 6,818,575 | B2 * | 11/2004 | Wallenberger ............ 501/35 |
| 6,867,158 | B2 | 3/2005 | Peuchert |
| 6,933,045 | B2 | 8/2005 | Tamura |
| 6,933,252 | B2 | 8/2005 | Pierce |
| 6,998,361 | B2 * | 2/2006 | Lewis ............ 501/36 |
| 7,022,634 | B2 * | 4/2006 | Hamilton et al. ............ 501/66 |
| 7,189,671 | B1 | 3/2007 | Lewis |
| 7,259,118 | B2 | 8/2007 | Jubb et al. |
| 7,285,510 | B2 | 10/2007 | Sakaguchi et al. |
| 7,449,419 | B2 | 11/2008 | Li |
| 7,509,819 | B2 | 3/2009 | Baker |
| 7,781,355 | B2 | 8/2010 | Berthereau et al. |
| 7,799,713 | B2 | 9/2010 | Hofmann et al. |
| 7,811,954 | B2 * | 10/2010 | Berthereau et al. ............ 501/36 |
| 7,823,417 | B2 * | 11/2010 | Hoffmann et al. ............ 65/335 |
| 2001/0011058 | A1 | 8/2001 | Tamura |
| 2002/0000101 | A1 | 1/2002 | Chenoweth |
| 2002/0045528 | A1 | 4/2002 | Kusuno et al. |
| 2003/0077178 | A1 | 4/2003 | Sterns |
| 2003/0100431 | A1 | 5/2003 | Koyo et al. |
| 2003/0166446 | A1 | 9/2003 | Lewis |
| 2003/0188554 | A1 | 10/2003 | Baker et al. |
| 2003/0207748 | A1 | 11/2003 | Wallenberger |
| 2003/0224922 | A1 | 12/2003 | Wallenberger |
| 2004/0092379 | A1 * | 5/2004 | Lewis ............ 501/70 |
| 2004/0220038 | A1 | 11/2004 | Wolff |
| 2005/0009683 | A1 * | 1/2005 | Hamilton et al. ............ 501/35 |
| 2005/0014624 | A1 | 1/2005 | LeJubb et al. |
| 2005/0031703 | A1 | 2/2005 | Beier et al. |
| 2005/0084440 | A1 | 4/2005 | Chacon et al. |
| 2005/0085369 | A1 | 4/2005 | Jensen |
| 2005/0090377 | A1 | 4/2005 | Shelestak et al. |
| 2005/0107238 | A1 | 5/2005 | Li |
| 2005/0130825 | A1 | 6/2005 | Kravchenko et al. |
| 2005/0232828 | A1 | 10/2005 | Merry |
| 2005/0234216 | A1 | 10/2005 | Klein et al. |
| 2006/0001005 | A1 | 1/2006 | Kishimoto et al. |
| 2006/0003884 | A1 | 1/2006 | Nishizawa et al. |
| 2006/0257240 | A1 | 11/2006 | Naskali et al. |
| 2007/0087139 | A1 | 4/2007 | Creux et al. |
| 2007/0105701 | A1 | 5/2007 | Hofmann et al. |
| 2007/0107220 | A1 | 5/2007 | Bakhuis et al. |
| 2008/0009403 | A1 | 1/2008 | Hofmann et al. |
| 2008/0053152 | A1 | 3/2008 | Kurachi et al. |
| 2008/0141721 | A1 | 6/2008 | Adams et al. |
| 2009/0286440 | A1 | 11/2009 | Lecomte et al. |
| 2010/0069220 | A1 | 3/2010 | McGinnis |
| 2010/0093511 | A1 | 4/2010 | Berthereau et al. |
| 2010/0160139 | A1 | 6/2010 | McGinnis |
| 2010/0160140 | A1 | 6/2010 | McGinnis |
| 2010/0162772 | A1 | 7/2010 | McGinnis |
| 2011/0003678 | A1 | 1/2011 | Hofmann |

FOREIGN PATENT DOCUMENTS

| | | | |
|---|---|---|---|
| CN | 1113893 | | 12/1995 |
| CN | 1243501 | | 2/2000 |
| CN | 1392870 | | 1/2003 |
| CN | 1678654 | | 10/2005 |
| CN | 101580344 | | 11/2009 |
| CN | 101597140 | | 12/2009 |
| CN | 101691278 | | 4/2010 |
| CN | 101838110 | | 9/2010 |
| CN | 101549958 | | 1/2011 |
| DE | 1496520 | | 8/1969 |
| EP | 500325 | | 8/1992 |
| EP | 931774 | | 7/1999 |
| FR | 1357393 | | 4/1964 |
| FR | 1435073 | | 4/1966 |
| FR | 1534135 | | 12/1968 |
| FR | 1589410 | | 3/1970 |
| FR | 2223328 | | 10/1974 |
| FR | 2692248 | | 12/1993 |
| FR | 2856055 | | 12/2004 |
| FR | 2879591 | | 6/2006 |
| GB | 428720 | | 5/1935 |
| GB | 1006524 | | 10/1965 |
| GB | 1147718 | | 4/1969 |
| GB | 1209244 | | 10/1970 |
| GB | 1531287 | | 11/1978 |
| JP | 45-011228 | | 5/1970 |
| JP | 51-055308 | | 5/1976 |
| JP | 58064243 | A * | 4/1983 |
| JP | 58-088138 | | 5/1983 |
| JP | 1-189985 | | 7/1989 |
| JP | 1-239039 | | 9/1989 |
| JP | 3-112650 | | 5/1991 |
| JP | 4-050144 | | 2/1992 |
| JP | 6-211543 | | 8/1994 |
| JP | 6-219780 | | 8/1994 |
| JP | 6-305773 | | 11/1994 |
| JP | 7-010598 | | 1/1995 |
| JP | 8-231240 | | 9/1996 |
| JP | 2582361 | | 2/1997 |
| JP | 11-021147 | | 1/1999 |
| JP | 1997-0176694 | | 1/1999 |
| JP | 2000-247677 | | 9/2000 |
| JP | 2000-247683 | | 9/2000 |
| JP | 2001-206733 | | 7/2001 |
| JP | 2001-316961 | | 11/2001 |
| JP | 2002-003237 | | 1/2002 |
| JP | 2002-060252 | | 2/2002 |
| JP | 2002-069941 | | 3/2002 |
| JP | 2002-081022 | | 3/2002 |
| JP | 2002-154843 | | 5/2002 |
| JP | 2002-293574 | | 10/2002 |
| JP | 2003-137590 | | 5/2003 |
| JP | 2003-160350 | | 6/2003 |
| JP | 2003-171143 | | 6/2003 |
| JP | 2003-183031 | | 7/2003 |
| JP | 2003-239847 | | 8/2003 |
| JP | 2003-321247 | | 11/2003 |
| JP | 2004-091307 | | 3/2004 |
| WO | 99/31021 | | 6/1999 |
| WO | 02/20419 | | 3/2002 |
| WO | 02/42233 | | 5/2002 |
| WO | 2004/020506 | | 3/2004 |
| WO | 2004/094794 | | 11/2004 |
| WO | 2005/092808 | | 10/2005 |
| WO | WO 2005093227 | A2 * | 10/2005 |

| | | |
|---|---|---|
| WO | 2006/064164 | 6/2006 |
| WO | 2007/055964 | 5/2007 |
| WO | 2007/055968 | 5/2007 |
| WO | 2008/073585 | 6/2008 |
| WO | 2010/075258 | 7/2010 |
| WO | 2010/075262 | 7/2010 |
| WO | 2010/075267 | 7/2010 |

OTHER PUBLICATIONS

Advisory Action from U.S. Appl. No. 10/560,068 dated Feb. 25, 2009.
Office action from U.S. Appl. No. 10/560,068 dated May 7, 2009.
Office action from U.S. Appl. No. 10/560,068 dated Nov. 5, 2009.
Advisory Action from U.S. Appl. No. 10/560,068 dated Mar. 16, 2010.
Panel Decision of Pre-Appeal Brief from U.S. Appl. No. 10/560,068 dated Apr. 29, 2010.
Examiner's Answer from U.S. Appl. No. 10/560,068 dated Aug. 3, 2010.
Office action from U.S. Appl. No. 11/267,702 dated Dec. 23, 2008.
Notice of Allowance from U.S. Appl. No. 11/267,702 dated Jul. 29, 2009.
Office action from U.S. Appl. No. 11/267,702 dated Dec. 3, 2009.
Notice of Allowance from U.S. Appl. No. 11/267,702 dated Jun. 16, 2010.
Office action from U.S. Appl. No. 11/267,739 dated Dec. 18, 2008.
Notice of Allowance from U.S. Appl. No. 11/267,739 dated Jul. 13, 2009.
Office action from U.S. Appl. No. 11/267,739 dated Dec. 3, 2009.
Notice of Allowance from U.S. Appl. No. 11/267,739 dated Apr. 7, 2010.
Office action from U.S. Appl. No. 11/722,039 dated Oct. 28, 2009.
Office action from U.S. Appl. No. 11/722,039 dated Jun. 22, 2010.
Interview Summary from U.S. Appl. No. 11/722,039 dated Sep. 21, 2010.
Office action from U.S. Appl. No. 11/722,039 dated Oct. 19, 2010.
Office action from U.S. Appl. No. 11/722,039 dated Jun. 7, 2011.
Office action from U.S. Appl. No. 12/341,985 dated Nov. 17, 2010.
Office action from U.S. Appl. No. 12/341,985 dated Apr. 21, 2011.
Notice of Allowance from U.S. Appl. No. 12/341,985 dated Oct. 12, 2011.
Office action from U.S. Appl. No. 12/344,130 dated Nov. 17, 2010.
Office action from U.S. Appl. No. 12/344,130 dated Apr. 20, 2011.
Notice of Allowance from U.S. Appl. No. 12/344,130 dated Oct. 11, 2011.
Office action from U.S. Appl. No. 12/403,955 dated Dec. 9, 201.
Office action from U.S. Appl. No. 12/847,206 dated Feb. 22, 2011.
Office action from U.S. Appl. No. 12/847,206 dated Oct. 14, 2011.
International Search Report from PCT/FRO4/01431 dated Jun. 11, 2003.
International Search Report from PCT/FRO5/51090 date Mar. 23, 2006.
International Search Report and Written Opinion from PCT/US06/42406 dated May 8, 2007.
International Search Report and Written Opinion from PCT/US06/42437 dated Apr. 30, 2007.
International Search Report and Written Opinion from PCT/US09/68949 dated May 7, 2010.
International Search Report and Written Opinion from PCT/US09/68955 dated May 7, 2010.
International Search Report and Written Opinion from PCT/US09/68965 dated May 7, 2010.
Office action from Australian Application No. 2006312015 dated May 5, 2011.
Office action from Australian Application No. 2006312106 dated May 5, 2011.
Office action from Chinese Application No. 200580043075.7 dated Dec. 7, 2011.
Office action from Chinese Application No. 200680041104.0 dated Aug. 4, 2010.
Office action from U.S. Appl. No. 11/722,039 dated Mar. 1, 2010.
Office action from Brazilian Application No. PI01149733 dated Mar. 10, 2009.
Office action from Canadian Application No. 2,528,923 dated Dec. 9, 2010 along with English translation of relevant portions of action.
Office action from Canadian Application No. 2,528,923 dated Jul. 12, 2011.
Office action from Chinese Application No. 200480015986.4 dated Jul. 6, 2007.
Office action from Chinese Application No. 200580043075.7 dated Feb. 5, 2010.
Office action from Chinese Application No. 200680041114.4 dated Feb. 29, 2012.
Office action from European Application No. 04767297.7 dated Sep. 8, 2006.
Search Report from French Registration No. 635569 (FR 0306981) dated Feb. 13, 2004.
Search Report from French Registration No. 658923 (FR 0413443) dated Aug. 16, 2005.
Office action from Indian Application No. 00501/KOLNP/2003 dated Jul. 7, 2006.
Office action from Indian Application No. 00501/KOLNP/2003 dated May 14, 2007.
Office action from Indian Application No. 2546/KOLNP/2005 dated Jun. 15, 2007.
Office action from Japanese Application No. 2002-544374 dated Sep. 28, 2007.
Office action from Japanese Application No. 2002-544374 dated Jul. 27, 2009.
Office action from Japanese Application No. 2002-544374 dated Jul. 12, 2010.
Office action from Japanese Application No. 2006-516274 dated Jun. 22, 2010.
Office action from Japanese Application No. 2006-516274 dated Feb. 22, 2011.
Office action from Korean Application No. 10-2005-7023679 dated Mar. 3, 2011.
Office action from Mexican Application No. PA/a/2002/000814 dated Feb. 22, 2006.
Office action from Mexican Application No. PA/a/2002/00814 dated Sep. 9, 2005.
Office action from Mexican Application No. PA/a/2002/00814 dated Jun. 23, 2005.
Office action from Mexican Application No. PA/a/2002/00814 dated Sep. 26, 2002.
Office action from Mexican Application No. 05/013323 dated Feb. 27, 2006.
Office action from Mexican Application No. 05/013323 dated May 29, 2009.
Office action from Mexican Application No. 07/06989 dated Aug. 22, 2007.
Office action from Russian Application No. 2007126843 dated Sep. 24, 2009.
Office action from Russian Application No. 2007126843 dated Dec. 11, 2009.
Office action from Canadian Application No. 2,426,637 dated Aug. 28, 2008.
Office action from Russian Application No. 2006100296/03 dated Jun. 6, 2008.
Office action from Russian Application No. 2006100296/03 dated Nov. 26, 2008.
Office action from U.S. Appl. No. 12/403,955 dated Apr. 24, 2012.
Office action from Taiwanese Application No. 094144552 dated May 7, 2012.
Notice of Allowance from U.S. Appl. No. 12/344,130 dated Jun. 7, 2012.
Notice of Allowance from U.S. Serial No. 12/341,985 dated Jun. 11, 2012.
Office action from Russian Application No. 2008117092/03 dated Apr. 26, 2012.
Office action from Mexican Application No. 07/06989 dated Jun. 26, 2012.
Office action from Chinese Application No. 200680041104.0 dated Mar. 22, 2011.
Office action from Chinese Application No. 200680041104.0 dated Jul. 14, 2011.

Office action from European Application No. 01987549.1 dated Aug. 5, 2011.
Office action from European Application No. 05825565.4 dated Dec. 14, 2007.
Office action from European Application No. 05825565.4 dated Nov. 19, 2010.
Office action from European Application No. 05825565.4 dated May 9, 2011.
Office action from European Application No. 05825565.4 dated Mar. 31, 2011.
Communicaton fom EP. applicaton No. 06827125.3 dated Jun. 4, 2009 whch includes the EP OA fom Feb. 13, 2009.
Office action from Indian Application No. 2108/KOLNP/2007 dated Jun. 28, 2011.
Office action from Japanese Application No. 2007-546144 dated Sep. 13, 2011.
Office action from Korean Application No. 2003-7005873 dated Jun. 26, 2007.
Office action from Korean Application No. 2003-7005873 dated Nov. 29, 2007.
Office action from Mexican Application No. 07/006989 dated Oct. 24, 2011.
Communication regarding Mexican Application No. 08/05816 dated Mar. 15, 2011.
Office action from Mexican Application No. 08/005819 dated Mar. 16, 2011.
Office action from Mexican Application No. 08/005819 dated Jun. 3, 2011.
Office action from Russian Application No. 2008117091 dated Apr. 19, 2010.
Office action from Russian Application No. 2008117091 dated Dec. 13, 2010.
Office action from Russian Application No. 2008117092 dated Oct. 12, 2011.
Aslanova, "Steklyannye volokna", Glass Fibers, Moscow, Khimiya, 1979, I, 256 pp. pp. 33, 34, Fig. 3.2).
Chernyak et al. "Nepreryvnoe steklyannoe volokno" Continuous Glass Fiber, Moscow, Khimiya, 1965.
Fredell, "Fiber metal laminates for improved structural integrity", 1992, conference paper.
Joosee, "Literature search of mechanical properties of fiber-reinforced plastics for wind turbine rotors", Dec. 1988 English abstract included.
Popov, et al., "Proizvodstvo i primenenie plavlenolitykh ogneuporov", Manufacture and Application of Molen Cast Refractory Materials, Moscow, Metallurgiya, 1985, IV, p. 212-213.
Office action from Chinese Application No. 200680041104.0 dated Jun. 13, 2012.
English Translation of JP Patent No. 2002-154843. Foreign patent along with English abstract previously submitted.
Office action from U.S. Appl. No. 11/699,719 dated Jul. 2, 2012.
Office action from Canadian Application No. 2,591,026 dated May 15, 2012 along with English translation of relevant portions of action.
Office action from Japanese Application No. 2008-540053 dated Jul. 30, 2012.
Office action from Japanese Application No. 2008-540052 dated Jul. 30, 2012.
Office action from Korean Application No. 10-2007-7016026 dated Aug. 9, 2012.
Office action from U.S. Appl. No. 12/643,411 dated Aug. 17, 2012.
Office action from U.S. Appl. No. 11/722,039 dated Aug. 24, 2012.
Lund, "Tensile strength of glass fibres", dated Feb. 18, 2010.
Office action from Chinese Application No. 200680041104.0 dated Sep. 13, 2012.
Office action from Japanese Application No. 2009-533917 dated Sep. 24, 2012.
Notice of Allowance from U.S. Appl. No. 12/341,985 dated Oct. 11, 2012.
Appeal Decision from U.S. Appl. No. 10/560,068 dated Aug. 15, 2012.
Office action from Canadian Application No. 2,626,733 dated Oct. 9, 2012.
Office action from European Application No. 09796243.5 dated Oct. 2, 2012.
Office action from Korean Application No. 2008-7010726 dated Nov. 14, 2012.
Office action from Korean Application No. 2008-7010727 dated Nov. 14, 2012.

* cited by examiner

METHOD OF MANUFACTURING HIGH PERFORMANCE GLASS FIBERS IN A REFRACTORY LINED MELTER AND FIBER FORMED THEREBY

CROSS REFERENCE TO RELATED APPLICATIONS

This application is a continuation of U.S. patent application Ser. No. 11/267,702 filed Nov. 4, 2005, the entire content of which is expressly incorporated herein by reference in its entirety.

TECHNICAL FIELD AND INDUSTRIAL APPLICABILITY OF THE INVENTION

The present invention is generally directed to a method of manufacturing continuous glass fibers for use in high-strength applications and fibers made thereby.

BACKGROUND OF THE INVENTION

The most common glass composition for making continuous glass fiber strands is "E-Glass." The liquidus temperature of E-Glass is approximately 2100° F. (1149° C.) or lower. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

S-Glass is a family of glasses composed primarily of the oxides of magnesium, aluminum, and silicon with a chemical composition that produces glass fibers having a higher mechanical strength than E-Glass fibers. The composition for forming S-Glass includes approximately 65 weight % $SiO_2$, 25 weight % $Al_2O_3$, and 10 weight % MgO. S-glass has a composition that was originally designed to be used in high-strength applications such as ballistic armor.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains approximately 58-60 weight % $SiO_2$, 23.5-25.5 weight % $Al_2O_3$, 14-17 weight % CaO plus MgO, 0% $B_2O_3$, 0% $F_2$ and less than 2 weight % miscellaneous components. R-Glass contains more alumina and silica than E-Glass and requires higher melting and processing temperatures during fiber forming. Typically, the melting and processing temperatures for R-Glass are at least 160° C. higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near 1000 poise. Fiberizing R-Glass at the customary 1000 poise viscosity would likely result in glass devitrification, which causes process interruptions and reduced productivity.

Tables IA-IE set forth the compositions for a number of conventional high-strength glass compositions.

TABLE I-A

| Constituent | Chinese High Strength glass | RUSSIAN CONTINUOUS ROVING MAGNESIUM ALUMINO-SILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | | 0.03 | 0.03 |
| MgO | 15.96 | 15.08 | 9.95 | 9.92 |
| $Na_2O$ | 0.12 | 0.063 | 0.08 | 0.09 |
| Fluorine | 0.03 | | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | | |
| $Cr_2O_3$ | | 0.011 | 0.003 | 0.003 |
| $Li_2O$ | | 1.63 | | |
| $CeO_2$ | | | | |

TABLE I-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $SiO_2$ | 65.51 | 64.60 | 64.20 | 63.90 | 58.64 |
| CaO | 0.44 | 0.58 | 0.63 | 0.26 | 0.61 |
| $Al_2O_3$ | 24.06 | 24.60 | 25.10 | 24.40 | 25.41 |
| $B_2O_3$ | | | | | 0.04 |
| MgO | 9.73 | 9.90 | 9.90 | 10.00 | 14.18 |
| $Na_2O$ | 0.04 | 0.06 | 0.020 | 0.039 | 0.05 |
| Fluorine | 0.07 | | | | 0.02 |
| $TiO_2$ | 0.016 | 0.000 | 0.000 | 0.210 | 0.624 |
| $Fe_2O_3$ | 0.067 | 0.079 | 0.083 | 0.520 | 0.253 |
| $K_2O$ | 0.020 | 0.020 | 0.020 | 0.540 | 0.35 |
| $ZrO_2$ | 0.079 | | | | |
| $Cr_2O_3$ | 0.0010 | | | 0.001 | 0.023 |
| $Li_2O$ | | | | | |
| $CeO_2$ | | | | | |

TABLE I-C

| Constituent | Chinese High Strength Yarn (8 micron) | Chinese High Strength Glass Roving | Zentron S-2 Glass Roving | SOLAIS Glass Sample | Advanced Glass Yarns R Glass |
|---|---|---|---|---|---|
| $SiO_2$ | 55.22 | 55.49 | 64.74 | 64.81 | 58.46 |
| CaO | 0.73 | 0.29 | 0.14 | 0.55 | 9.39 |
| $Al_2O_3$ | 24.42 | 24.88 | 24.70 | 24.51 | 24.55 |
| $B_2O_3$ | 3.46 | 3.52 |  | 0.02 | 0.04 |
| MgO | 12.46 | 12.28 | 10.24 | 9.35 | 5.91 |
| $Na_2O$ | 0.104 | 0.06 | 0.17 | 0.16 | 0.079 |
| Fluorine | 0.07 |  |  | 0.02 | 0.054 |
| $TiO_2$ | 0.32 | 0.36 | 0.015 | 0.04 | 0.196 |
| $Fe_2O_3$ | 0.980 | 0.930 | 0.045 | 0.238 | 0.400 |
| $K_2O$ | 0.240 | 0.150 | 0.005 | 0.03 | 0.67 |
| $ZrO_2$ |  |  |  |  |  |
| $Cr_2O_3$ | 0.0050 |  |  | 0.007 | 0.005 |
| $Li_2O$ | 0.59 | 0.63 |  |  |  |
| $CeO_2$ | 1.23 | 1.25 |  |  |  |

TABLE I-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $SiO_2$ | 64.61 | 59.37 | 58.34 | 58.58 | 58.12 |
| CaO | 0.17 | 0.27 | 0.31 | 0.30 | 0.31 |
| $Al_2O_3$ | 24.84 | 25.49 | 23.81 | 24.26 | 24.09 |
| $B_2O_3$ | 0.04 | 0.05 |  |  |  |
| MgO | 10.11 | 13.47 | 14.99 | 15.02 | 15.36 |
| $Na_2O$ | 0.118 | 0.024 | 0.05 | 0.02 | 0.03 |
| Fluorine | 0.03 |  | 0.04 | 0.04 | 0.04 |
| $TiO_2$ | 0.011 | 0.530 | 1.380 | 0.67 | 0.91 |
| $Fe_2O_3$ | 0.042 | 0.374 | 0.333 | 0.336 | 0.303 |
| $K_2O$ |  | 0.48 | 0.42 | 0.28 | 0.29 |
| $ZrO_2$ |  | 0.152 | 0.129 | 0.165 | 0.157 |
| $Cr_2O_3$ | 0.0050 | 0.0120 | 0.0100 | 0.0120 | 0.0120 |
| $Li_2O$ |  |  |  |  |  |
| $CeO_2$ |  |  |  |  |  |

TABLE I-E

| Constituent | IVG Vertex Outside #2 Glass Roving | RH CG250 P109 Glass Fiber Strand |
|---|---|---|
| $SiO_2$ | 58.69 | 58.54 |
| CaO | 0.29 | 9.35 |
| $Al_2O_3$ | 24.3 | 25.39 |
| $B_2O_3$ |  |  |
| MgO | 15.06 | 6.15 |
| $Na_2O$ | 0.03 | 0.10 |
| Fluorine | 0.04 | 0.16 |
| $TiO_2$ | 0.64 | 0.008 |
| $Fe_2O_3$ | 0.331 | 0.069 |
| $K_2O$ | 0.36 | 0.14 |
| $ZrO_2$ | 0.187 | 0.006 |
| $Cr_2O_3$ | 0.0130 |  |
| $Li_2O$ |  |  |
| $CeO_2$ |  |  |

R-Glass and S-Glass are produced by melting the constituents of the compositions in a platinum-lined melting container. The costs of forming R-Glass and S-Glass fibers are dramatically higher than E-Glass fibers due to the cost of producing the fibers in such melters. Thus, there is a need in the art for methods of forming glass compositions useful in the formation of high performance glass fibers from a direct-melt process in a refractory-lined furnace and fibers formed by the method.

SUMMARY OF THE INVENTION

The invention, in part, is a method of manufacturing a glass composition for the formation of continuous glass fibers that are suitable for use in high-strength applications. The composition useful in the present invention may be inexpensively formed into glass fibers using low-cost, direct melting in refractory-lined furnaces due to the relatively low fiberizing temperature of the glass fibers. Once formed into fibers, the glass composition provides the strength characteristics of higher-priced glass fibers such as S-Glass. The composition of the present invention includes about 60.5 to about 70.5 weight % $SiO_2$, about 10.0 to about 24.5 weight % $Al_2O_3$, about 6.0 to about 20.0 weight % RO, where RO equals the sum of MgO, CaO, SrO and BaO, and about 0.0 to about 3.0 weight % alkali metal oxides. In a preferred embodiment, the glass composition is composed of about 61 to about 68 weight % $SiO_2$, about 15 to about 19 weight % $Al_2O_3$, about 15 to about 20 weight % RO, where RO equals the sum of MgO, CaO, SrO and BaO, and about 0 to about 3 weight % alkali metal oxides. The composition preferably does not contain more than about 4 weight % of oxides or halogens selected from the group consisting of ZnO, $SO_3$, Fluorine, $B_2O_3$, $TiO_2$, $ZrO_2$ and $Fe_2O_3$. The desired properties of the high performance composite fibers manufactured by the present invention include a fiberizing temperature of less than about 2650° F. and a liquidus temperature that is preferably below the fiberizing temperature by at least about 80° F., more preferably by at least about 120° F., and most preferably by at least about 150° F.

The present invention includes a process for producing refined glass from a raw glass batch in a refractory lined glass melter. The process includes charging a raw glass batch to a melting zone of a glass melter, melts the raw glass batch within the melting zone and forming fibers from the melt. The present invention also includes fibers formed by such a method

DETAILED DESCRIPTION AND PREFERRED EMBODIMENTS OF THE INVENTION

Fiberizing properties of the glass composition used to form the glass fibers utilized in the method of the present invention include the fiberizing temperature, the liquidus, and delta-T. The fiberizing temperature is defined as the temperature that corresponds to a viscosity of about 1000 Poise. As discussed in more detail below, a lowered fiberizing temperature reduces the production cost of the fibers, allows for a longer bushing life, increases throughput, permits the glass to be melted in a refractory-lined melter, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive composition to be melted in a refractory-lined melter since both its melting and fiberizing temperatures are below the upper use temperatures of many commercially available refractories.

The liquidus is defined as the highest temperature at which equilibrium exists between liquid glass and its primary crystalline phase. At all temperatures above the liquidus, the glass is free from crystals in its primary phase. At temperatures below the liquidus, crystals may form.

Another fiberizing property is delta-T ($\Delta T$), which is defined as the difference between the fiberizing temperature and the liquidus. A larger $\Delta T$ offers a greater degree of flexibility during the formation of the glass fibers and helps to inhibit devitrification of the glass (that is, the formation of crystals within the melt) during melting and fiberizing. Increasing the $\Delta T$ also reduces the production cost of the glass fibers by allowing for a greater bushing life and by providing a wider process window for forming fibers.

The glasses of the present invention are suitable for melting in traditional commercially available refractory-lined glass melters which are widely used in the manufacture of glass reinforcement fibers. Starting batch components typically include $SiO_2$ (ground silica sand), and $Al_2O_3$ (calcined alumina), as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite).

FIGS. 1-4 depict a glass melting furnace 10 useful in the method of forming the glass fibers described herein and set forth in the examples and claims below. The glass melting furnace 10 provides molten glass to a glass forehearth 12. The molten glass is preferably composed of about 60.5 to about 70.5 weight percent $SiO_2$, about 10.0 to about 24.5 weight percent $Al_2O_3$, about 6.0 to about 20.0 weight percent RO, where RO equals the sum of MgO, CaO, and SrO, and about 0.0 to about 3.0 weight percent alkali metal oxides. A fiber formed in accordance with the present invention will typically include small amounts of ZnO, $SO_3$, Fluorine, $B_2O_3$, $TiO_2$ and $Fe_2O_3$, preferably in an amount of less than about 4 weight percent. In addition, a fiber formed in accordance with the method and composition of the present invention will preferably having a fiberizing temperature of less than about 2650° F., a $\Delta T$ of at least about 80° F., preferably a $\Delta T$ of at least about 120° F., and most preferably a $\Delta T$ of at least about 150° F., and a coefficient of thermal expansion (CTE) of about $2.28 \times 10^{-6}$ in/in/° F. to about $2.77 \times 10^{-6}$ in/in/° F. Further, the glass fibers manufactured by the method of the present invention preferably have a strength in excess of about 600 KPSI, preferably a strength in excess of about 630 KPSI, and most preferably a strength in excess of about 695 KPSI. Further, the glass fibers will desirably have a modulus greater than about 12.0 MPSI, preferably greater then about 12.18 MPSI, and most preferably greater then about 12.6 MPSI. It will be appreciated that certain details of construction are not provided in view of such details being conventional and well within the skill of the art.

The method of the present invention is preferably performed using the glass melting furnace 10, which includes an elongated channel having an upstream end wall 14a, a downstream end wall 16, side walls 18, a floor 20, and a roof 22. Each of the components of the glass melting furnace 10 are made from appropriate refractory materials such as alumina, chromic oxide, silica, alumina-silica, zircon, zirconia-alumina-silica, or similar oxide-based refractory materials. The roof 22 is shown generally as having an arcuate shape transverse to the longitudinal axis of the composition the channel; however, the roof may have any suitable design. The roof 22 is typically positioned between about 3-10 feet above the surface of the glass batch composition 30. The glass batch material 30 is a mixture of raw materials used in the manufacture of glass in the accordance with the present invention. The glass melting furnace 10 may optionally include one more bubblers 24 and/or electrical boost electrodes (not shown). The bubblers 24 and/or electrical boost electrodes increase the temperature of the bulk glass and increase the molten glass circulation under the batch cover.

In addition, the glass melting furnace 10 may include two successive zones, an upstream melting zone 26 and a downstream refining zone 28. In the melting zone 26, the glass batch composition 30 may be charged into the furnace using a charging device 32 of a type well-known in the art.

In one suitable melter configuration, the glass batch material 30 forms a batch layer of solid particles on the surface of the molten glass in the melting zone 26 of the glass melting furnace 10. The floating solid batch particles of the glass batch composition 30 are at least partially melted by at least one burner 34 having a controlled flame shape and length mounted within the roof 22 of the glass melting furnace 10.

Figure 1:
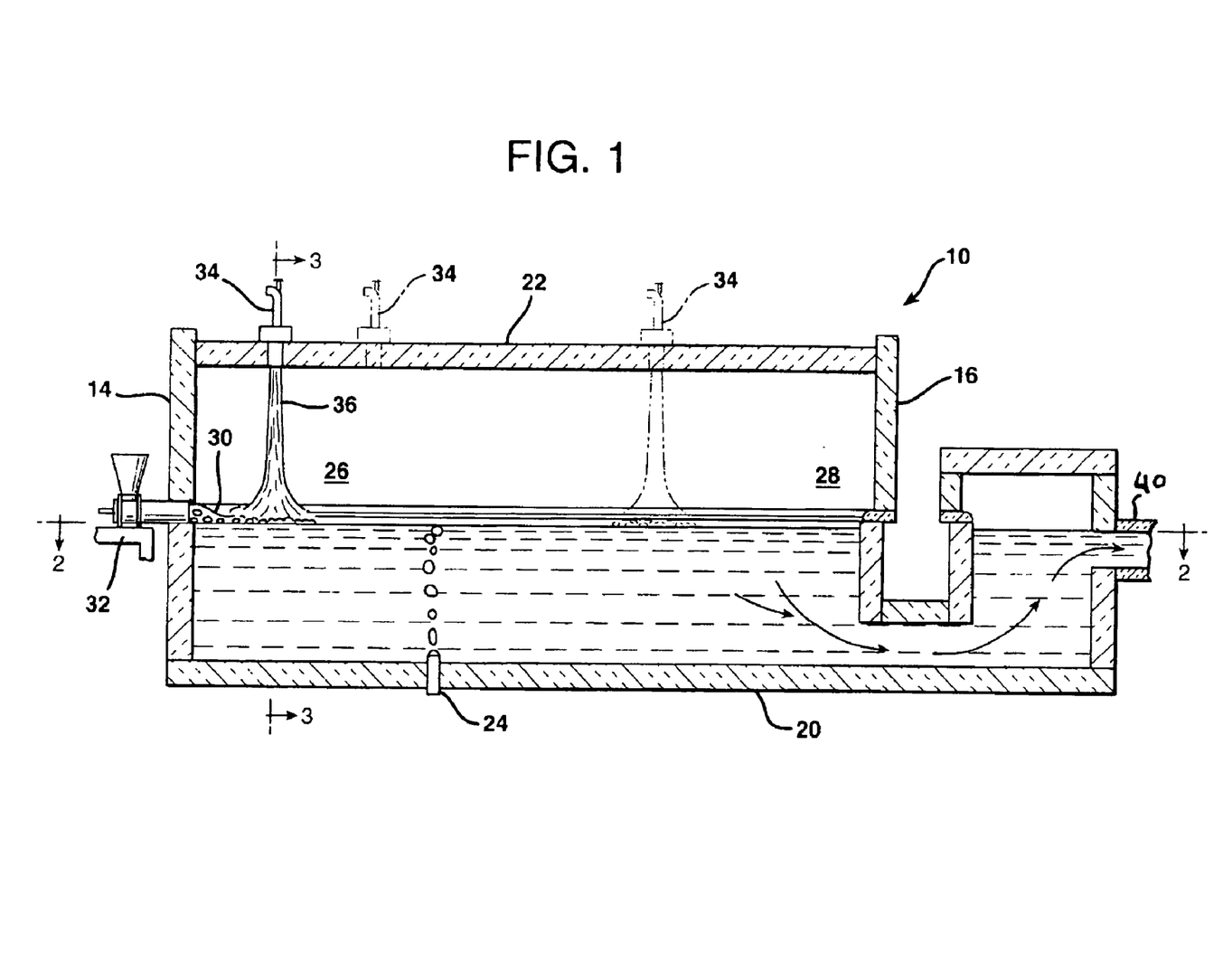
FIG. 1 is a cross-sectional longitudinal view of a glass melting furnace useful with the method of the present invention.
Figure 2:
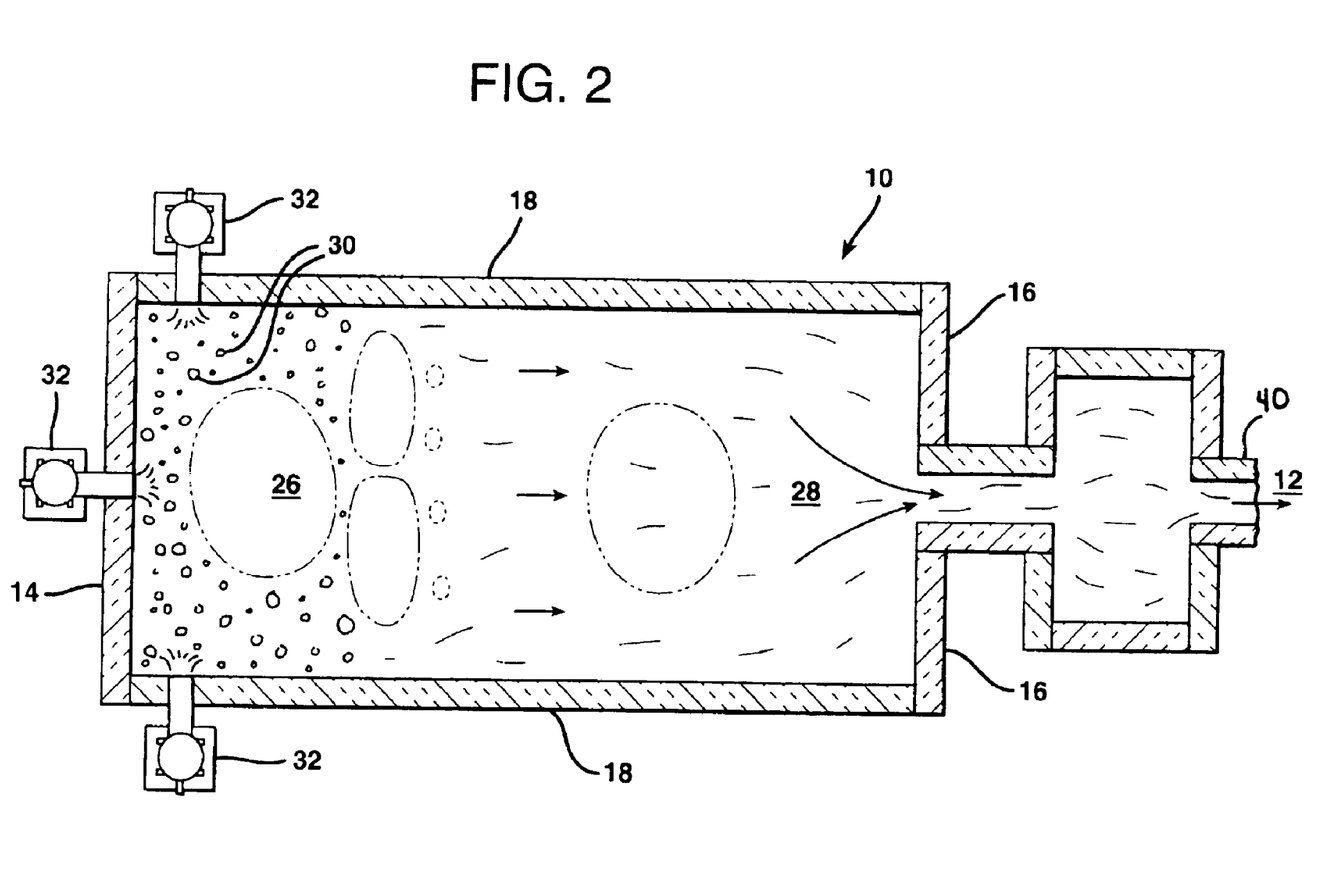
FIG. 2 is a cross-sectional plan view of the glass melting furnace of FIG. 1 taken along line 2-2.
Figure 3:
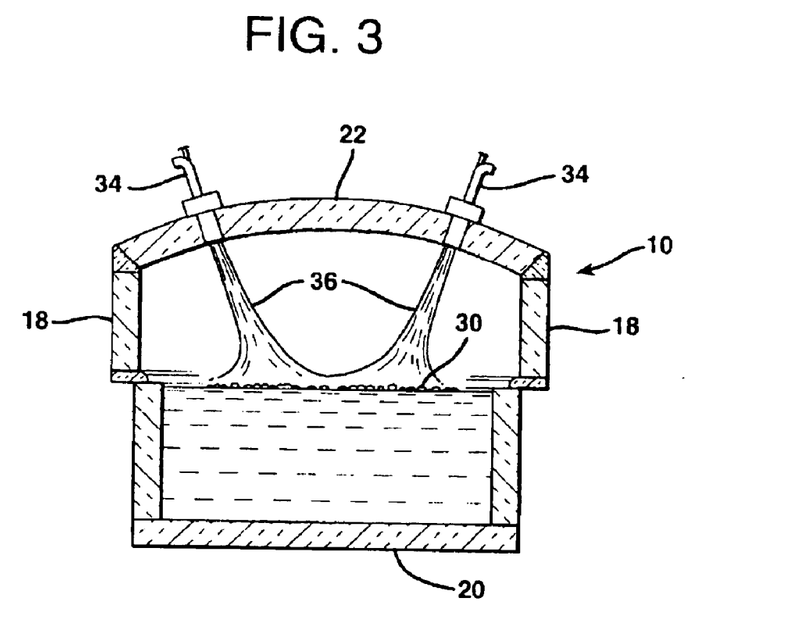
FIG. 3 is a cross-sectional view of the glass melting furnace of FIG. 1 taken along line 3-3 illustrating two burners adjacent the upstream end wall of the furnace.
Figure 4:
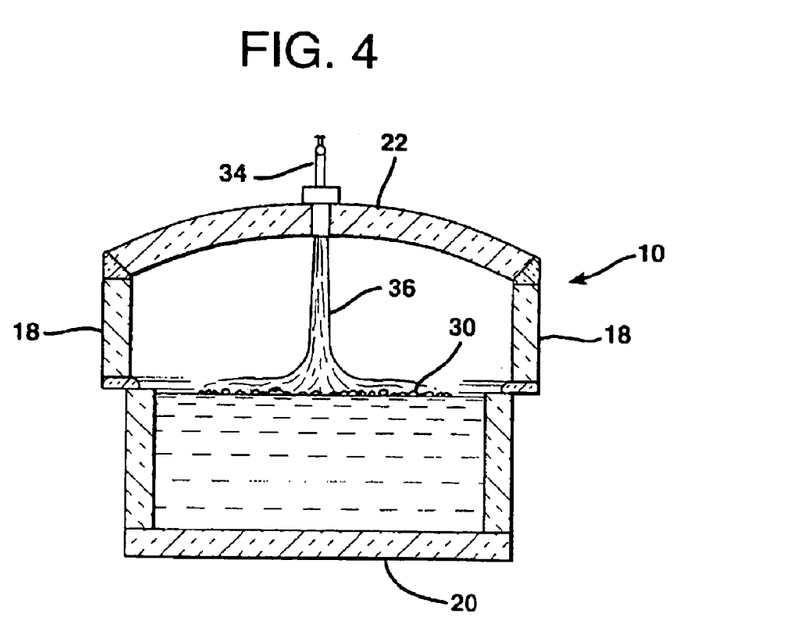
FIG. 4 is an alternate cross-sectional plan view of the glass melting furnace of FIG. 1 taken along line 3-3 illustrating one burner adjacent the upstream end wall of the furnace.

In one preferred embodiment, as shown in FIG. 1, the glass melting furnace 10 includes three burners 34. A single burner 34 is positioned upstream of two adjacently positioned downstream burners 34. However, it will be appreciated that any number of burners 34 may be positioned at any suitable location in the roof 22 of the furnace 10 over the batch to melt the glass batch composition 30. For example, two burners 34 may be positioned in a side-by-side relationship (FIG. 3) or a single burner may be used (FIG. 4).

Other conventional melters may be used without departing from the present invention. Conventional melters include Air-Gas melters, Oxygen-Gas melters, electrically fired melters, or any fossil fuel fired melter. It is possible to add electric boost or bubblers to any of the melting processes. It is also possible to include a separate refining zone (as shown in FIG. 1 or incorporate the refining zone into the main tank of the melter.

Figure 5:
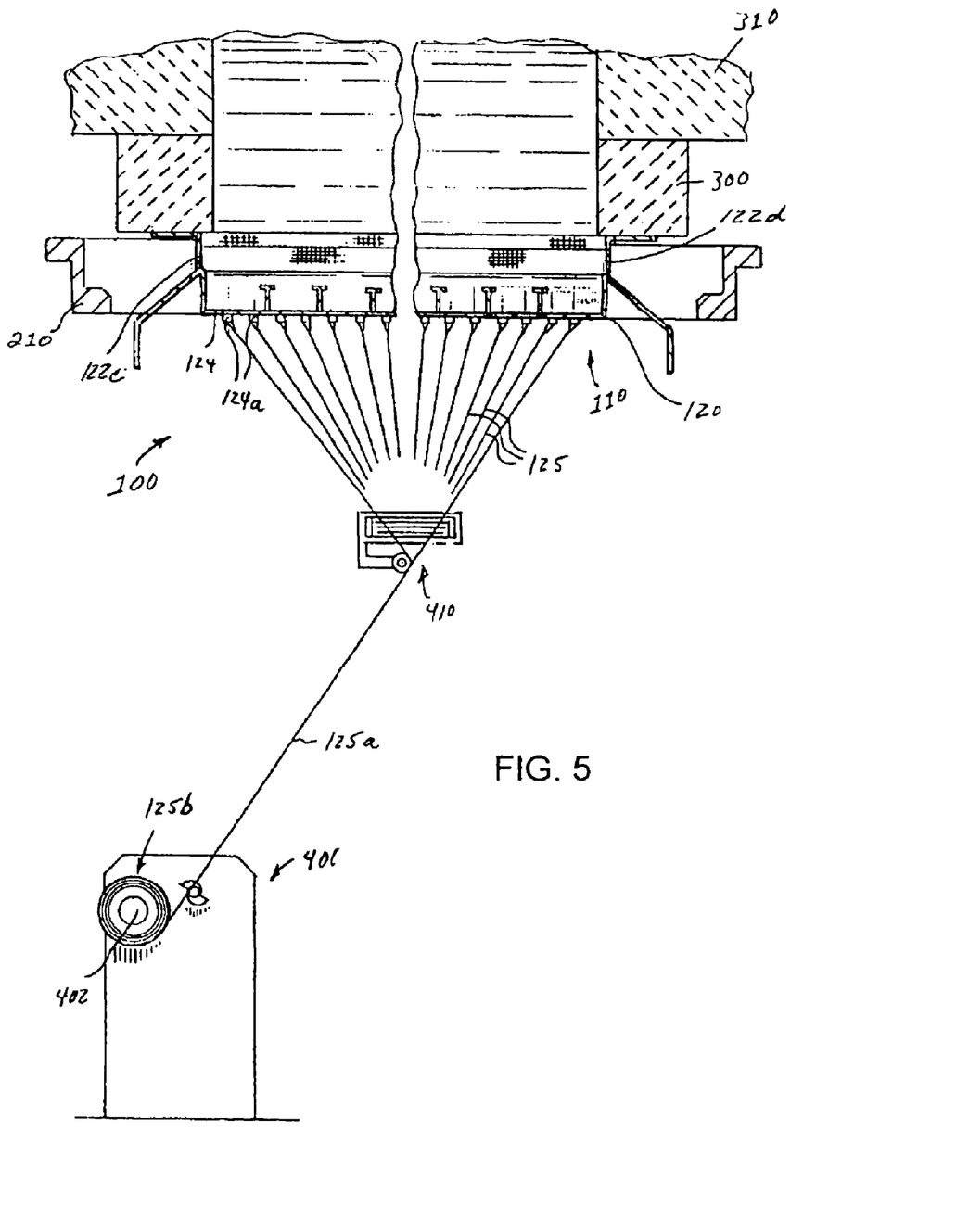
FIG. 5 is a side view, partially in cross section, of a bushing assembly/support structure arrangement for producing continuous glass filaments useful in the method of the present invention.

As shown in FIG. 5, a bushing assembly 100 includes a bushing 110 and a bushing frame 210. The bushing 110 includes a bushing main body 120 with sidewalls 122 and a tip plate 124 extending between the sidewalls 122. The main body 120 is positioned below a bushing block 300 that, in turn, is positioned beneath a forehearth 310. In practicing the method of the present invention, a stream of molten glass is received by the main body 120 from the forehearth 310. The forehearth 310 receives the molten glass from a melter 10 (shown in FIG. 1). A delivery channel 40 is positioned between the melter 10 and the forehearth 310 to deliver the molten glass batch composition 30 from the melter 10 to the forehearth 310. The forehearth 310 and bushing block 300 may be conventional in construction and may be formed from refractory materials.

The tip plate 124 contains a plurality of nozzles 124a (also referred to herein as orifices) through which a plurality of streams of molten glass may be discharged. The streams of molten material may be mechanically drawn from the tip plate 124 to form continuous filaments 125 via a conventional winder device 400. The filaments 125 may be gathered into a single continuous strand 125a after having received a protective coating of a sizing composition from a sizing applicator 410. The continuous filaments 125a may be wound onto a rotating collet 402 of the winder device 400 to form a package 125b. The continuous filaments 125 may also be processed into other desired composite glass materials including, without limitation, wet used chopped strand fibers, dry use chopped strand fibers, continuous filament mats, chopped strand mats, wet formed mats or air laid mats.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IIC were melted in platinum crucibles or in a continuous platinum-lined melter for determining the mechanical and physical properties of the glass and fibers produced therefrom. The units of measurement for the physical properties are: Viscosity (° F.), Liquidus temperature (° F.) and ΔT (° F.). In some examples the glasses were fiberized and Strength (KPsi), Density (g/cc), Modulus (MPsi), Softening Point (° F.) and coefficient of thermal expansion (CTE) (in/in/(° F.)) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber. The CTE was measured with a dilatometer over the range of temperature from 25 to 600 degrees C. The softening point temperature was measured using the ASTM C338 fiber-elongation method.

TABLE IIA

| Glass | Ex. 1 | Ex. 2 | Ex. 3 | Ex. 4 | Ex. 5 | Ex. 6 |
|---|---|---|---|---|---|---|
| $SiO_2$ | 62.63 | 62.42 | 61.75 | 63.01 | 63.07 | 63.16 |
| CaO | 8.49 | 8.64 | 8.57 | 4.84 | 4.85 | 4.8 |
| $Al_2O_3$ | 18.50 | 18.54 | 18.82 | 19.99 | 20.03 | 19.76 |
| MgO | 9.47 | 9.64 | 9.65 | 11.26 | 11.28 | 11.33 |
| $Na_2O$ | 0.70 | 0.69 | 0.70 | 0.70 | | |
| $TiO_2$ | 0.00 | 0.01 | 0.01 | 0.00 | 0.01 | 0.02 |
| $Fe_2O_3$ | 0.20 | 0.05 | 0.045 | 0.20 | 0.05 | 0.037 |
| Measured Viscosity (° F.) | 2491 | na | na | 2514 | na | na |
| Measured Liquidus (° F.) | 2261 | 2247 | na | 2335 | na | na |
| Measured DT (° F.) | 230 | na | na | 179 | na | na |
| Measured Strength (KPsi) | 672 | na | na | 695 | na | na |
| Measured Density (g/cc) | 2.556 | na | na | 2.530 | na | na |
| Measured Modulus (MPsi) | 12.4 | 12.6 | na | 12.6 | 12.7 | na |
| Softening Point (° F.) | na | na | na | 1765 | na | na |
| CTE in/in/(° F.) | na | na | na | $2.28 \times 10^{-6}$ | na | na |

TABLE II-B

| Glass | Ex. 7 | Ex. 8 | Ex. 9 | Ex. 10 | Ex. 11 | Ex. 12 |
|---|---|---|---|---|---|---|
| $SiO_2$ | 62.32 | 63.89 | 63.14 | 61.39 | 61.39 | 65.00 |
| CaO | 11.56 | 11.21 | 11.96 | 11.96 | 8.71 | 13.00 |
| $Al_2O_3$ | 17.25 | 16.39 | 16.39 | 18.14 | 18.89 | 15.00 |
| MgO | 7.98 | 6.62 | 6.62 | 6.62 | 9.62 | 5.00 |
| $Na_2O$ | 0.70 | 0.75 | 0.75 | 0.75 | 0.25 | 1.00 |
| $TiO_2$ | 0.00 | 0.75 | 0.75 | 0.75 | 0.75 | 1.00 |
| $Fe_2O_3$ | 0.20 | 0.39 | 0.39 | 0.39 | 0.39 | |
| Measured Viscosity (° F.) | 2458 | 2493 | 2435 | 2431 | 2434 | 2509 |
| Measured Liquidus (° F.) | 2301 | 2268 | 2294 | 2353 | 2261 | 2226 |
| Measured DT (° F.) | 157 | 225 | 141 | 78 | 173 | 283 |
| Measured Strength (KPsi) | 632 | 636 | 622 | 615 | 682 | 612 |
| Measured Density (g/cc) | 2.573 | 2.553 | 2.567 | 2.567 | 2.564 | na |
| Measured Modulus (MPsi) | 12.2 | 12.2 | 12.2 | 12.2 | 12.6 | na |
| Softening Point (° F.) | 1729 | na | na | na | na | na |
| CTE in/in/ (° F.) | $2.77 \times 10^{-6}$ | na | na | na | na | na |

TABLE II-C

| Glass | Ex. 13 | Ex. 14 | Ex. 15 | Ex. 16 | Ex. 17 | Ex. 18 |
|---|---|---|---|---|---|---|
| $SiO_2$ | 63.89 | 65.00 | 64.00 | 63.89 | 65.00 | 65.00 |
| CaO | 6.96 | 14.00 | 4.00 | 8.96 | 14.00 | 12.50 |
| $Al_2O_3$ | 18.64 | 15.00 | 20.00 | 18.89 | 15.00 | 15.00 |
| MgO | 9.62 | 6.00 | 11.00 | 6.62 | 5.00 | 5.00 |
| $Na_2O$ | 0.25 | 0.00 | 1.00 | 0.75 | 0.00 | 1.00 |
| $TiO_2$ | 0.25 | 0.00 | 0.00 | 0.75 | 1.00 | 1.00 |
| $Fe_2O_3$ | 0.39 | 0.00 | 0.00 | 0.14 | 0.00 | 0.50 |
| Measured Viscosity (° F.) | 2513 | 2508 | 2548 | 2565 | 2481 | 2523 |
| Measured Liquidus (° F.) | 2337 | 2373 | 2401 | 2288 | 2403 | 2227 |
| Measured DT (° F.) | 176 | 135 | 147 | 277 | 78 | 296 |
| Measured Strength (KPsi) | 695 | 624 | na | na | 604 | na |
| Measured Density (g/cc) | 2.480 | 2.554 | na | na | 2.546 | na |
| Measured Modulus (MPsi) | 12.3 | 12.0 | na | na | 11.9 | na |
| Softening Point (° F.) | na | na | na | na | na | na |
| CTE in/in/ (° F.) | na | na | na | na | na | na |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

As apparent from the above examples, glass fiber compositions of the invention have advantageous properties, such as low fiberizing temperatures and wide differences between the liquidus temperatures and the fiberizing temperatures (high $\Delta T$ values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A process for producing glass fibers from raw glass batch in a refractory lined glass melter, the process comprising the steps of:
   charging raw glass batch to the melting zone of the glass melter, the glass batch comprising:
   about 60.5 to about 70.5 weight percent $SiO_2$;
   about 10 to about 24.5 weight percent $Al_2O_3$;
   about 11.96 to about 20.0 weight percent RO, where RO equals the sum of MgO, CaO, SrO and BaO in the batch composition, wherein the amount of MgO in said alkaline earth oxide comprises at least 5 weight percent of said batch composition and the amount of CaO in said alkaline earth oxide comprises at least 6.96 weight percent of said batch composition; and
   0 to about 3 weight percent alkali metal oxides;
   heating the glass batch to a forming temperature in excess of the liquidus temperature of a resulting glass to form a fiberizable molten glass; and
   fiberizing said molten glass to produce glass fibers having no a fiberizing temperature of less than about 2650° F.

2. The process of claim 1, wherein glass produced from said batch has a $\Delta T$ of at least about 80° F.

3. The process of claim 2, wherein glass produced from said batch has a $\Delta T$ of at least 120° F.

4. The process of claim 1, wherein the glass melter is lined with a refractory material selected from the group consisting of alumina, silica, chromic oxide, alumina-silica, zircon, zirconia-alumina-silica and combinations thereof.

5. The process of claim 1, wherein said glass batch further comprises less than 4 weight percent of compounds selected from the group consisting of ZnO, $SO_3$, Fluorine, $B_2O_3$, $TiO_2$ and $Fe_2O_3$.

6. The process of claim 1, wherein said glass batch includes less than about 1% $TiO_2$.

7. The process of claim 1, wherein the glass produced from said glass batch includes $\Delta T$ of at least about 135° F.

8. A process for producing glass from raw glass-forming material in a refractory lined glass melter, the glass melter having a roof, a bottom and side walls defining an elongated channel having a melting zone and a downstream refining zone, the process comprising the steps of:
   charging raw glass batch to the melting zone of the glass melter, the glass batch comprising:
   60.5-70.5 weight percent $SiO_2$;
   10-24.5 weight percent $Al_2O_3$;
   11.96 to 20.0 weight percent RO, where RO equals the sum of MgO, CaO, SrO and BaO, wherein the amount of MgO in said alkaline earth oxide comprises at least 5 weight percent of said batch composition and the amount of CaO in said alkaline earth oxide comprises at least 6.96 weight percent of said batch composition;
   less than about 1% $TiO_2$; and
   0 to 3 weight percent alkali metal oxides;
   providing at least one burner within the roof of the glass melter; and melting the glass batch to form a fiberizable molten glass.

9. The process of claim 8, wherein the glass melter is lined with a refractory material selected from the group consisting of alumina, chromic oxide, silica, alumina-silica, zircon, zirconia-alumina-silica and combinations thereof.

10. The process of claim 8, wherein the glass produced from the batch is fiberized at a forming temperature of less than 2650° F.

11. The process of claim 8, wherein the glass produced from said glass batch includes $\Delta T$ of at least about 135° F.

12. A process for producing glass fibers from raw glass batch in a refractory lined glass melter, the process comprising:
   charging raw glass batch to the melting zone of the glass melter, the glass batch comprising:
   about 60.5 to about 70.5 weight percent $SiO_2$;
   about 10 to about 24.5 weight percent $Al_2O_3$;
   about 11.96 to about 20.0 weight percent alkaline earth oxide, wherein the amount of MgO in said alkaline earth oxide comprises at least 5 weight percent of said batch composition and the amount of CaO in said alkaline earth oxide comprises at least 6.96 weight percent of said batch composition;
   0 to about 3 weight percent alkali metal oxides;
   heating the glass batch to a forming temperature in excess of the liquidus temperature of a resulting glass to form a fiberizable molten glass; and
   fiberizing said molten glass to produce glass fibers having a fiberizing temperature of less than about 2650° F.

13. The process of claim 12, wherein said glass batch further comprises less than 4 weight percent of compounds selected from ZnO, $SO_3$, Fluorine, $B_2O_3$, $TiO_2$ and $Fe_2O_3$.

14. The process of claim 12, wherein glass produced from said batch has a $\Delta T$ of at least about 80° F.

15. The process of claim 12, wherein the glass melter is lined with a refractory material selected from alumina, chromic oxide, silica, alumina-silica, zircon, zirconia-alumina-silica and combinations thereof.

16. The process of claim 12, wherein said glass batch includes less than about 1% $TiO_2$.

17. The process of claim 12, wherein the glass produced from said glass batch includes $\Delta T$ of at least about 135° F.

18. A process for producing glass from raw glass-forming material in a refractory lined glass melter, said glass melter having a roof, a bottom and side walls defining an elongated channel having a melting zone and a downstream refining zone, the process comprising:

charging raw glass batch to the melting zone of the glass melter, the glass batch including:
- 60.5-70.5 weight percent $SiO_2$;
- 10-24.5 weight percent $Al_2O_3$;
- 11.96 to 20.0 weight percent alkaline earth oxide, said alkaline earth oxide being the sum of MgO, CaO, SrO and BaO, wherein the amount of MgO in said alkaline earth oxide comprises at least 5 weight percent of said batch composition and the amount of CaO in said alkaline earth oxide comprises at least 6.96 weight percent of said batch composition;
- less than about 1% $TiO_2$;
- up to 3 weight percent alkali metal oxides; and
- less than 4 weight percent of compounds selected from the group consisting of ZnO, $SO_3$, Fluorine, $B_2O_3$, $TiO_2$ and $Fe_2O_3$, providing at least one burner within the roof of the glass melter; and melting the glass batch to form a fiberizable molten glass.

19. The process of claim 18, wherein glass produced from said batch has a fiberizing temperature of less than about 2650° F. and a ΔT of at least about 80° F.

20. The process of claim 18, wherein said glass melter is lined with a refractory material selected from alumina, chromic oxide, silica, alumina-silica, zircon, zirconia-alumina-silica and combinations thereof.

21. The process of claim 18, wherein the glass produced from said glass batch includes ΔT of at least about 135° F.

* * * * *

UNITED STATES PATENT AND TRADEMARK OFFICE
CERTIFICATE OF CORRECTION

PATENT NO. : 8,341,978 B2
APPLICATION NO. : 12/880289
DATED : January 1, 2013
INVENTOR(S) : Douglas A. Hoffmann et al.

It is certified that error appears in the above-identified patent and that said Letters Patent is hereby corrected as shown below:

Col. 9, line 51 (claim 1), please delete the word "no".

Signed and Sealed this
Nineteenth Day of February, 2013

Teresa Stanek Rea
*Acting Director of the United States Patent and Trademark Office*